A. N. MERRILL.
Tea Kettle.
No. 64,685.
Patented May 14, 1867.
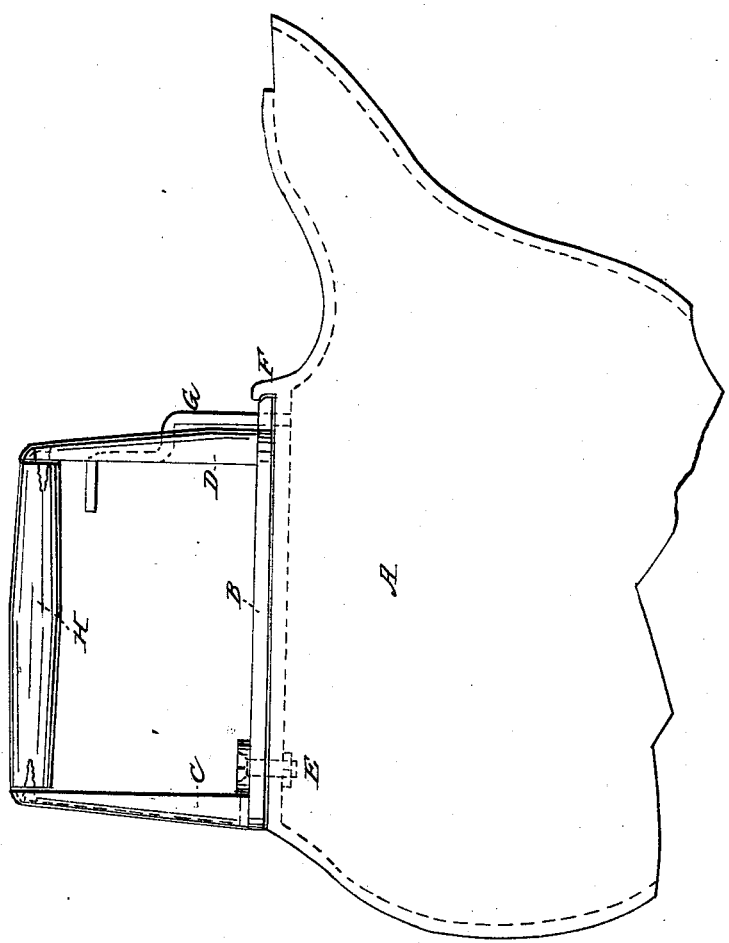
WITNESSES:
Theo Frusche
Wm Trewin
INVENTOR:
Allen N. Merrill
Per Munn & Co
Attorneys

United States Patent Office.

ALLEN N. MERRILL, OF BATAVIA, ILLINOIS.

Letters Patent No. 64,685, dated May 14, 1867.

IMPROVEMENT IN KETTLES.

*The Schedule referred to in these Letters Patent and making part of the same.*

TO ALL WHOM IT MAY CONCERN:

Be it known that I, ALLEN N. MERRILL, of Batavia, in the county of Kane, and State of Illinois, have invented a new and useful Improvement in Kettles; and I do hereby declare that the following is a full, clear, and exact description thereof, which will enable others skilled in the art to make and use the same, reference being had to the accompanying drawings, forming part of this specification.

This improvement relates to the manner in which the handle and cover are attached together and to the kettle, and to the manner of fastening the lid or cover to the kettle; and the invention consists in pivoting the cover to the rim or flange of the kettle at one side, or eccentrically, and in providing a lip at the opposite side of the top of the kettle, by which the lid is fastened or prevented from rising without raising the kettle, and also in the manner in which the cover is locked in that position.

The drawing represents a sectional elevation of the kettle constructed according to my plan.

A is the kettle. B is the cover or lid of the kettle with two vertical arms attached, marked C and D. E is the pivot bolt upon which the cover turns. F is the lip under which the edge of the cover passes, and by which the cover is fastened down. G is a slide-bolt by which the cover is held in position. H is the handle, which is of wood. The cover B and the arms or stands C D are cast together, and the wooden handle is attached by screws or pins, as seen in the drawing. The pivot-bolt E passes through the cover and through the rim of the kettle with screw-nut and washer, in such a manner that the cover is allowed to turn in it when it is to be removed from the orifice of the kettle, or when it is to be closed. When the orifice is closed, as seen in the drawing, the lip F prevents the cover from rising. The slide-bolt G passes through the arm D, and it is so shaped that its upper end is convenient to be raised by the finger when the cover is to be removed or turned. The lower end passes through the cover and through the rim of the kettle, so that the cover cannot be moved laterally until the bolt is raised. When the cover is to be removed the bolt is raised and the cover is slipped from under the lip as it turns on its hinge or pivot, uncovering the top of the kettle.

What I claim as new, and desire to secure by Letters Patent, is—

The eccentric hinge E, the lip F, the slide-bolt G, and the wood handle H, in combination with the cover B, the arms C D, and the kettle A, substantially as described.

ALLEN N. MERRILL.

Witnesses:
WILLIAM COFFIN,
H. C. PADDOCK.